UNITED STATES PATENT OFFICE 2,606,882

CERTAIN MIXTURES OF CERTAIN OXY-ALKYLATED RESINS IN COMBINATION WITH CERTAIN PARTIAL ACIDIC ESTERS

Melvin De Groote, University City, and Arthur F. Wirtel, Kirkwood, Mo., assignors to Petrolite Corporation, a corporation of Delaware No Drawing. Application June 15, 1949, Serial No. 99,362

10 Claims. (Cl. 260—20)

The present invention is concerned with certain new mixtures of two different types of materials. More specifically, the invention is concerned with a mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from an hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical and at least one of said groups containing a free diglycollic acid radical.

The second component of the above-mentioned mixture is the oxyalkylation product of:

(A) An alpha-beta alkylene oxide having not more than 4 carbon atoms and selected from the class consisting of ethylene oxide, glycide and methylglycide; and (B) An oxyalkylation-susceptible, fusible, organic-solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

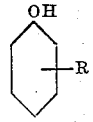

in which R is a hydrocarbon radical having at least 4 and not more than 18 carbon atoms and substituted in the 2,4,6 position; said oxyalkylated resin being characterized by the introduction into the resin molecule of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than 2 moles of alkylene oxide be introduced for each phenolic nucleus; the first component being 20% to 40% by weight of the mixture, and the second component being 80% to 60% by weight of the mixture.

The invention includes not only the mixture or mixtures previously described, but also the method of making the same.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 99,361, filed June 15, 1949.

The above described mixtures not only have use as demulsifiers, as noted, but also are useful for certain other purposes. They may be used as a break-inducer in the doctor treatment of sour hydrocarbons; the mixture may be used as an intermediate for the preparation of more complicated derivatives, for instance, the mixture, since it contains one component having a free hydroxyl radical and another component having a free carboxyl radical, may be heated in the usual manner so as to produce incipient esterification, and thus yield a resinous material, which, in the early stages, is still soluble in numerous organic solvents, particularly the solvents which were useful in preparing solutions of the individual components. Such material, while still soluble, can be subjected to oxyalkylation, particularly extensive oxyethylation, so as to yield a product which is completely soluble in water and is an excellent demulsifier.

The first component of the mixture which is present to a minor degree and represents not more than 40% of the mixture, and preferably represents 25% of the mixture, is the compound described in U. S. Patent No. 2,442,073, dated May 25, 1948, to De Groote and Wirtel. The first claim in this particular patent describes the compound as " . . . an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from a hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and being additional to the number of such groups ester-linked to any other polyhydric alcohol radical contained in the ester, and at least one of said groups containing a free diglycollic acid radical."

The second component which constitutes the major proportion of the compound, to wit, at least 60%, or more, and preferably 75%, is a product described in co-pending application of De Groote and Keiser, Serial No. 42,131, filed August 2, 1948, now abandoned, and is identified therein as ". . . oxyalkylation products of:

"(A) An alpha-beta alkylene oxide having not more than 4 carbon atoms and selected from the class consisting of ethylene oxide, glycide, and methylglycide; and "(B) An oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

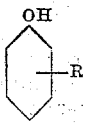

in which R is a hydrocarbon radical having at least 4 and not more than 18 carbon atoms and substituted in the 2,4,6, position; said oxyalkylated resin being characterized by the introduction into the resin molecule of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than 2 moles of alkylene oxide be introduced for each phenolic nucleus."

Having obtained the two products or types of materials specified, mixture is made within the range hereinafter specified.

The two products or types of materials which are admixed to form the compositions of the invention, are each described in detail in our Patent 2,574,538, granted November 13, 1951, on application Serial No. 99,361, filed June 15, 1949, and reference is made to that patent for a detailed description of the two products or types of materials and for a large number of examples of each. Specifically, reference is made to Examples 1a through 118a of the patent for examples of suitable resins and Examples 1b through 5b and the tables which appear in columns 43, 44, 45 and 46 for examples of the oxyalkylated resins which form one component or type of material used in the compositions of the present invention.

Reference is made to Examples 1c through 12c for examples of the second component or type of material used in preparing the new compositions of this invention, that is, the acidic partial esters.

The new compositions herein described are mechanical mixtures of two other types of materials: (1) an acidic partial ester which has recognized demulsifying properties; and (2) an oxyalkylated derivative which normally does not exhibit any demulsifying properties, at least not to a sufficient degree as to justify characterization.

These two materials described in our said Patent 2,574,538 are mixed so that the oxyalkylated resin consists of 60 to 80 parts of the mixture on a solvent-free basis, and the partial acidic ester supplies 40 to 20 parts of the mixture on a solvent-free basis. Needless to say, after the mixture has been prepared solvents can be added to give a convenient dilution of the final product, or if desired, the solvent may be present in either ingredient prior to mixing. Mixing is done by any suitable mechanical agitation at room temperature or slightly above, i. e., 30° to 40° C. The mixtures invariably give homogeneous products, although in a few instances we have added a bit more of a polar solvent or oxygen-containing solvent such as propyl alcohol, butyl alcohol, cresylic acid, the diethylether of ethylene glycol, diethylether of diethyleneglycol, acetone, or the like, or any of the other common solvents, such as high boiling aromatic petroleum solvents, so as to make the solution absolutely clear or transparent.

Of all the acidic esters employed, we prefer those derived from castor oil, triricinolein and particularly those identified as 5c, 6c, 8c and 9c, of Patent 2,574,538. Of the oxyalkylated derivatives, we prefer those obtained by use of ethylene oxide, and particularly where substantially one mole of ethylene oxide has been added per phenolic nucleus originally present in the resin. By "substantially one mole" we mean anywhere from .85 of a mole to 1.15 moles. Out of a large number of mixtures which we have prepared, the following table summarizes more than 100 of such mixtures. These particular units were obtained from the preferable components, to wit, the partial acidic esters 5c, 6c, 8c and 9c, of Patent 2,574,538, and from oxyethylated resins in which substantially one mole of ethylene oxide had been added. These series of resins contained a certain amount of solvent, generally xylene, as previously described in Patent 2,574,538 and indicated by numbers 104b, 109b, 114b, etc. therein.

In the table the first column indicates the mixture example number beginning with 1d, 2d, etc., of Patent 2,574,538; the second column indicates the particular solvent-containing oxyalkylated resin employed and specifies the example number, such as 104b, 109b, 114b, etc., of Patent 2,574,538; the third column indicates the pounds of such material, including the solvent employed in the mix; the fourth column identifies the particular partial acidic ester employed and previously described as 5c, 6c, etc., of Patent 2,574,538; and the fifth column shows the pounds of partial acidic ester used in the mixture.

All these mixtures were prepared by simply stirring the compounds together at room temperature or slightly above, to wit, 30° to 40° C., until the mixture was homogeneous. It will be noted that in these mixtures two ratios were employed—a 2 to 1 mixture and a 3 to 1 mixture. The latter, i. e., 3 parts of the oxyalkylated compound and 1 part of the partial acidic ester, gave mixtures which were most advantageous for breaking oil field emulsions.

| Mixture Ex. No. | Oxyalkylated Resin Ex. No. of Patent 2,574,538 | Lbs. Used Solvent Included | Partial Acidic Ester Ex. No. of Patent 2,574,538 | Lbs. Used in Mix |
|---|---|---|---|---|
| 1d | 104b | 34.0 | 5c | 10.0 |
| 2d | 104b | 34.0 | 5c | 6.0 |
| 3d | 104b | 34.0 | 6c | 10.0 |
| 4d | 104b | 34.0 | 6c | 6.0 |
| 5d | 104b | 34.0 | 8c | 10.0 |
| 6d | 104b | 34.0 | 8c | 6.0 |
| 7d | 104b | 34.0 | 9c | 10.0 |
| 8d | 104b | 34.0 | 9c | 6.0 |
| 9d | 109b | 33.0 | 5c | 9.0 |
| 10d | 109b | 33.0 | 5c | 6.0 |
| 11d | 109b | 33.0 | 6c | 9.0 |
| 12d | 109b | 33.0 | 6c | 6.0 |
| 13d | 109b | 33.0 | 8c | 9.0 |
| 14d | 109b | 33.0 | 8c | 6.0 |
| 15d | 109b | 33.0 | 9c | 9.0 |
| 16d | 109b | 33.0 | 9c | 6.0 |
| 17d | 114b | 33.25 | 5c | 8.5 |
| 18d | 114b | 33.25 | 5c | 6.3 |
| 19d | 114b | 33.25 | 6c | 8.5 |
| 20d | 114b | 33.25 | 6c | 6.3 |
| 21d | 114b | 33.25 | 8c | 8.5 |
| 22d | 114b | 33.25 | 8c | 6.3 |
| 23d | 114b | 33.25 | 9c | 8.5 |
| 24d | 114b | 33.25 | 9c | 6.3 |
| 25d | 119b | 33.0 | 5c | 9.65 |
| 26d | 119b | 33.0 | 5c | 6.40 |
| 27d | 119b | 33.0 | 6c | 9.65 |
| 28d | 119b | 33.0 | 6c | 6.40 |
| 29d | 119b | 33.0 | 8c | 9.65 |
| 30d | 119b | 33.0 | 8c | 6.40 |
| 31d | 119b | 33.0 | 9c | 9.65 |
| 32d | 119b | 33.0 | 9c | 6.40 |
| 33d | 124b | 34.25 | 5c | 10.00 |
| 34d | 124b | 34.25 | 5c | 6.65 |
| 35d | 124b | 34.25 | 6c | 10.00 |
| 36d | 124b | 34.25 | 6c | 6.65 |
| 37d | 124b | 34.25 | 8c | 10.00 |
| 38d | 124b | 34.25 | 8c | 6.65 |
| 39d | 124b | 34.25 | 9c | 10.00 |
| 40d | 124b | 34.25 | 9c | 6.65 |
| 41d | 129b | 32.75 | 5c | 10.00 |
| 42d | 129b | 32.75 | 5c | 6.60 |
| 43d | 129b | 32.75 | 6c | 10.00 |
| 44d | 129b | 32.75 | 6c | 6.60 |
| 45d | 129b | 32.75 | 8c | 10.00 |
| 46d | 129b | 32.75 | 8c | 6.60 |
| 47d | 129b | 32.75 | 9c | 10.00 |
| 48d | 129b | 32.75 | 9c | 6.60 |
| 49d | 134b | 32.7 | 5c | 10.8 |
| 50d | 134b | 32.7 | 5c | 7.a |
| 51d | 134b | 32.7 | 6c | 10.8 |
| 52d | 134b | 32.7 | 6c | 7.2 |
| 53d | 134b | 32.7 | 8c | 10.8 |
| 54d | 134b | 32.7 | 8c | 7.2 |
| 55d | 134b | 32.7 | 9c | 10.8 |
| 56d | 134b | 32.7 | 9c | 7.2 |
| 57d | 139b | 30.5 | 5c | 10.0 |
| 58d | 139b | 30.5 | 5c | 6.6 |
| 59d | 139b | 30.5 | 6c | 10.0 |
| 60d | 139b | 30.5 | 6c | 6.6 |
| 61d | 139b | 30.5 | 8c | 10.0 |
| 62d | 139b | 30.5 | 8c | 6.6 |
| 63d | 139b | 30.5 | 9c | 10.0 |
| 64d | 139b | 30.5 | 9c | 6.6 |
| 65d | 144b | 33.7 | 5c | 10.8 |
| 66d | 144b | 33.7 | 5c | 7.2 |
| 67d | 144b | 33.7 | 6c | 10.8 |
| 68d | 144b | 33.7 | 6c | 7.2 |
| 69d | 144b | 33.7 | 8c | 10.8 |
| 70d | 144b | 33.7 | 8c | 7.2 |
| 71d | 144b | 33.7 | 9c | 10.8 |
| 72d | 144b | 33.7 | 9c | 7.2 |
| 73d | 149b | 33.6 | 5c | 9.9 |
| 74d | 149b | 33.6 | 5c | 6.6 |
| 75d | 149b | 33.6 | 6c | 9.9 |
| 76d | 149b | 33.6 | 6c | 6.6 |
| 77d | 149b | 33.6 | 8c | 9.9 |
| 78d | 149b | 33.6 | 8c | 6.6 |
| 79d | 149b | 33.6 | 9c | 9.9 |
| 80d | 149b | 33.6 | 9c | 6.6 |
| 81d | 154b | 34.6 | 5c | 11.9 |
| 82d | 154b | 34.6 | 5c | 7.9 |
| 83d | 154b | 34.6 | 6c | 11.9 |
| 84d | 154b | 34.6 | 6c | 7.9 |
| 85d | 154b | 34.6 | 8c | 11.9 |
| 86d | 154b | 34.6 | 8c | 7.9 |
| 87d | 154b | 34.6 | 9c | 11.9 |
| 88d | 154b | 34.6 | 9c | 7.9 |
| 89d | 161b | 33.4 | 5c | 10.7 |
| 90d | 161b | 33.4 | 5c | 7.1 |
| 91d | 161b | 33.4 | 6c | 10.7 |
| 92d | 161b | 33.4 | 6c | 7.1 |
| 93d | 161b | 33.4 | 8c | 10.7 |
| 94d | 161b | 33.4 | 8c | 7.1 |
| 95d | 161b | 33.4 | 9c | 10.7 |
| 96d | 161b | 33.4 | 9c | 7.1 |
| 97d | 166b | 32.9 | 5c | 10.0 |
| 98d | 166b | 32.9 | 5c | 6.6 |
| 99d | 166b | 32.9 | 6c | 10.0 |
| 100d | 166b | 32.9 | 6c | 6.6 |
| 101d | 166b | 32.9 | 8c | 10.0 |
| 102d | 166b | 32.9 | 8c | 6.0 |
| 103d | 166b | 32.9 | 9c | 10.0 |
| 104d | 166b | 32.9 | 9c | 6.6 |
| 105d | 171b | 32.9 | 5c | 10.5 |
| 106d | 171b | 31.9 | 5c | 7.0 |
| 107d | 171b | 31.9 | 6c | 10.5 |
| 108d | 171b | 31.9 | 6c | 7.0 |
| 109d | 171b | 31.9 | 8c | 10.5 |
| 110d | 171b | 31.9 | 8c | 7.0 |
| 111d | 171b | 31.9 | 9c | 10.5 |
| 112d | 171b | 31.9 | 9c | 7.0 |
| 113d | 176b | 32.3 | 5c | 9.8 |
| 114b | 176b | 32.3 | 5c | 6.5 |
| 115d | 176b | 32.3 | 6c | 9.8 |
| 116d | 176b | 32.3 | 6c | 6.5 |
| 117d | 176b | 32.3 | 8c | 19.8 |
| 118d | 176b | 32.3 | 8c | 6.5 |
| 119d | 176b | 32.3 | 9c | 9.8 |
| 120d | 176b | 32.8 | 9c | 6.5 |

Having thus described our invention, what we claim as new and desire to secure by Letters Patent is:

1. A mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from an hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto, and at least one of said groups containing a free diglycollic acid radical; and the second component is the oxyalkylation product of (A) an alpha-beta alkylene oxide having not more than 4 carbon atoms and selected from the class consisting of ethylene oxide, glycide and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionally greater than two; said phenol being of the formula:

in which R is a hydrocarbon radical having at least 4 and not more than 18 carbon atoms and substituted in one of the positions ortho and para; said oxyalkylated resin being characterized by the introduction into the resin molecule at the phenolic hydroxyls of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than 2 moles of alkylene oxide be introduced for each phenolic nucleus; the first component being 20% to 40% by weight of the mixture and the second component being 80% to 60% by weight of the mixture.

2. A mixture of two components in which the first component is an acidic partial ester containing: (a) at least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from a hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto and at least one of said groups containing a free diglycollic acid radial; and the second component is the oxyethylation product of (A) ethylene, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula:

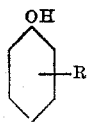

in which R is a hydrocarbon radical having at least 4 and not more than 18 carbon atoms and substituted in one of the positions ortho and para; said oxyethylated resin being characterized by the introduction into the resin molecule at the phenolic hydroxyls of a plurality of divalent radicals having the formula C2H4O; with the proviso that from about one-half to less than 2 moles of ethylene oxide be introduced for each phenolic nucleus; the first component being 20% to 40% by weight of the mixture and the second component being 80% to 60% by weight of the mixture.

3. A mixture of two components in which the first component is an acidic partial ester containing: (a) least one polyhydric alcohol radical; (b) at least one diglycollic acid radical; and (c) a plurality of acyloxy radicals, each having 8 to 32 carbon atoms derived from a detergent-forming monocarboxy acid having 8 to 32 carbon atoms, with the proviso that at least one of said acyloxy radicals is derived from a hydroxylated detergent-forming monocarboxy acid having 8 to 32 carbon atoms, each of said polyhydric alcohol radicals being ester-linked with a plurality of groups, each of which groups contains at least one of said acyloxy radicals, the number of said groups ester-linked to each polyhydric alcohol radical being at least equal in number in each instance to the valency of the polyhydric alcohol radical, so that each polyhydric alcohol radical is free from any uncombined hydroxyl radical directly attached thereto, and at least one of said groups containing a free diglycollic acid radical; and the second component is the oxyethylation product of (A) ethylene oxide; and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula:

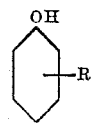

in which R is an aliphatic hydrocarbon radical having at least 4 and not more than 18 carbon atoms and substituted in one of the positions ortho and para; said oxyethylated resin being characterized by the introduction into the resin molecule at the phenolic hydroxyls of a plurality of divalent radicals having the formula C2H4O; with the proviso that from about one-half to less than 2 moles of ethylene oxide be introduced for each phenolic nucleus; the first component being 20% to 40% by weight of the mixture and the second component being 80% to 60% by weight of the mixture.

4. The mixture of claim 3, wherein the ratio of ethylene oxide employed in the manufacture of the second component is substantially a molal ratio of 1 to 1, based on the phenolic hydroxyl present in the phenol entering into the resin manufacture.

5. The mixture of claim 3, wherein the ratio of ethylene oxide employed in the manufacture of the second component is substantially a molal ratio of 1 to 1, based on the phenolic hydroxyl present in the phenol entering into the resin manufacture, and the ratio of the first component to the second component being 1 to 3.

6. The mixture of claim 3, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component contains only one polyhydric alcohol radical and all detergent-forming monocarboxy acyloxy radicals are ricinoleic acid radicals.

7. The mixture of claim 3, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component contains only one polyhydric alcohol radical, all detergent-forming monocarboxy acyloxy radicals are ricinoleic acid radicals, and the first component is a triricinolein diglycollate.

8. The mixture of claim 3, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component contains only one polyhydric alcohol radical, all detergent-forming monocarboxy acyloxy radicals are ricinoleic acid radicals, and the first component is triricinolein mono-diglycollate.

9. The mixture of claim 3, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component contains only one polyhydric alcohol radical, all detergent-forming monocarboxy acyloxy radicals are ricinoleic acid radicals, and the first component is triricinolein di-diglycollate.

10. The mixture of claim 3, wherein the ratio of ethylene oxide employed in the manufacture of the second component is substantially a molal ratio of 1 to 1, based on the phenolic hydroxyl present in the phenol entering into the resin manufacture, the ratio of the first component to the second component being 1 to 3, and the first component contains only one polyhydric alcohol radical, all detergent-forming monocarboxy acyloxy radicals are ricinoleic acid radicals, and the first component is triricinolein tri-diglycollate.

MELVIN DE GROOTE.
ARTHUR F. WIRTEL.

REFERENCES CITED

The following references are of record in the file of this patent:

UNITED STATES PATENTS

| Number | Name | Date |
| --- | --- | --- |
| 2,442,073 | De Groote et al. | May 25, 1948 |
| 2,454,541 | Bock et al. | Nov. 23, 1948 |